United States Patent [19]

Bosland

[11] 3,761,686

[45] Sept. 25, 1973

[54] SENSING SPRING ARRANGEMENT FOR CARD READER

[75] Inventor: Cornelius William Bosland, Hershey, Pa.

[73] Assignee: AMP Incorporated, Harrisbrug, Pa.

[22] Filed: May 17, 1971

[21] Appl. No.: 144,256

Related U.S. Application Data

[63] Continuation of Ser. No. 746,783, July 23, 1968, abandoned.

[52] U.S. Cl. .............. 235/61.11 C, 200/46, 340/339

[51] Int. Cl. .... G06k 7/06, H01h 43/08, H05b 39/00

[58] Field of Search .............. 235/61.11 R, 61.11 A, 235/61.11 B, 61.11 C; 200/46; 339/17, 17 C; 340/339

[56] References Cited

UNITED STATES PATENTS

| | | | |
|---|---|---|---|
| 3,148,251 | 9/1964 | Burke | 235/61.11 A |
| 3,352,981 | 11/1967 | Ekers | 235/61.11 C UX |
| 3,513,299 | 5/1970 | Loose | 235/61.11 A |
| 3,425,010 | 1/1969 | Klann | 200/46 UX |
| 3,567,911 | 3/1971 | Grundberg | 235/61.11 A |

*Primary Examiner*—Thomas J. Sloyan
*Attorney*—Curtis, Morris and Safford, Marshall M. Holcombe, William Hintze, William J. Keating, Frederick W. Raring, John R. Hopkins, Adrian J. LaRue and Jay L. Seitchik

[57] ABSTRACT

An improved sensing spring arrangement for a card reader. The springs are held in a head and are predeflected by precisely located shoulders to given accurate vertical alignment of the tips of the springs. The springs themselves have a tapered configuration so that when deflected the stresses along each spring are approximately uniform and less than the fatigue stress limit of the spring.

10 Claims, 4 Drawing Figures

Figure 1:
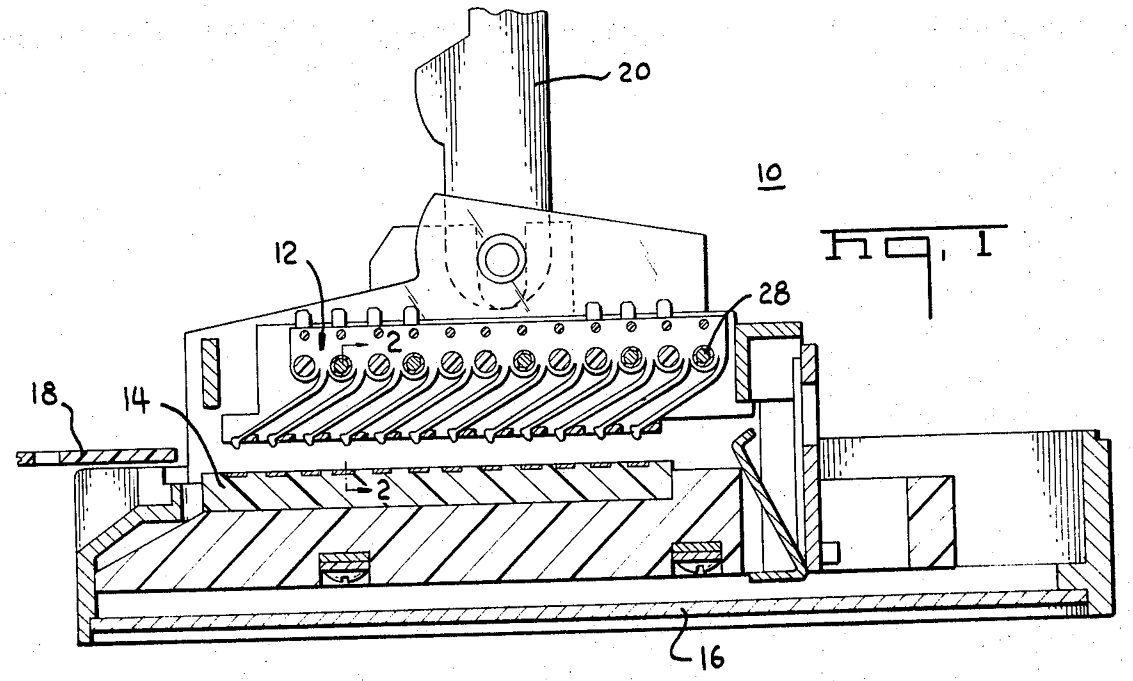

INVENTOR
CORNELIUS W. BOSLAND

BY Edward P. Brandeau

INVENTOR
CORNELIUS W. BOSLAND

BY Edward P. Brandeau

SENSING SPRING ARRANGEMENT FOR CARD READER

This application is a continuation of application Ser. No. 746,783, filed July 23, 1968 and now abandoned.

This invention relates to an improved sensing spring arrangement for reading or sensing the holes in a card, such as one of the newer credit cards, having coded information in the form of holes punched through the card.

An object of this invention is to provide a sensing spring arrangement which has greater reliability and which gives improved performance in a card reader.

Another object is to provide better control of mechanical stress in the sensing springs of a card reader.

These and other objects will in part be understood from and in part pointed out in the following description.

In a card reader to which the invention relates, a multitude of sensing springs are held in a matrix or head. The springs and head are moved as a unit toward or away from a platen on which can be placed a card, such as a credit card, to be read. The sensing springs are precisely mounted on closely spaced centers which correspond to the positions where holes in the card may occur. Wherever there is a hole, the corresponding spring extends through and makes electrical contact with a conducting pad or strip on the platen. Now, the thickness of a credit card may, for example, be twenty-thousandths of an inch, which is several times the thickness of a standard tabulating card, and so each sensing spring must be able to deflect by this relatively large amount, depending on whether it encounters a hole in the credit card or not. From the standpoint of the mechanism which moves the spring head against the platen it is desirable that the force required not change greatly regardless of how many or how few holes there are in a card. It is also desirable that the individual springs be able to stand without fatigue the mechanical flexing encountered over many millions of card reading cycles. Moreover the electrical and mechanical contacting action of the springs must be such that excessive contact resistance and contact wear are avoided over long periods of time and use. The present invention provides an improved sensing spring arrangement which achieves these objectives.

In accordance with the invention, in one specific embodiment thereof, the sensing springs for a card reader are made of flat strip stock, each spring being specially shaped along its length and precisely located in an overall assembly. An important result of this shaping is that when the sensing end of the spring is deflected, the stresses at cross-sections along the spring remain approximately equal to each other, and always less than the fatigue stress limit of the spring material. In comparison with arrangements used previously in similar applications the variation in the force on the tips of these new springs when reading a hole in a card and when reading a no-hole condition is substantially reduced. This results in improved performance, both mechanically and electrically, of a card reader having these new sensing springs.

Figure 2:
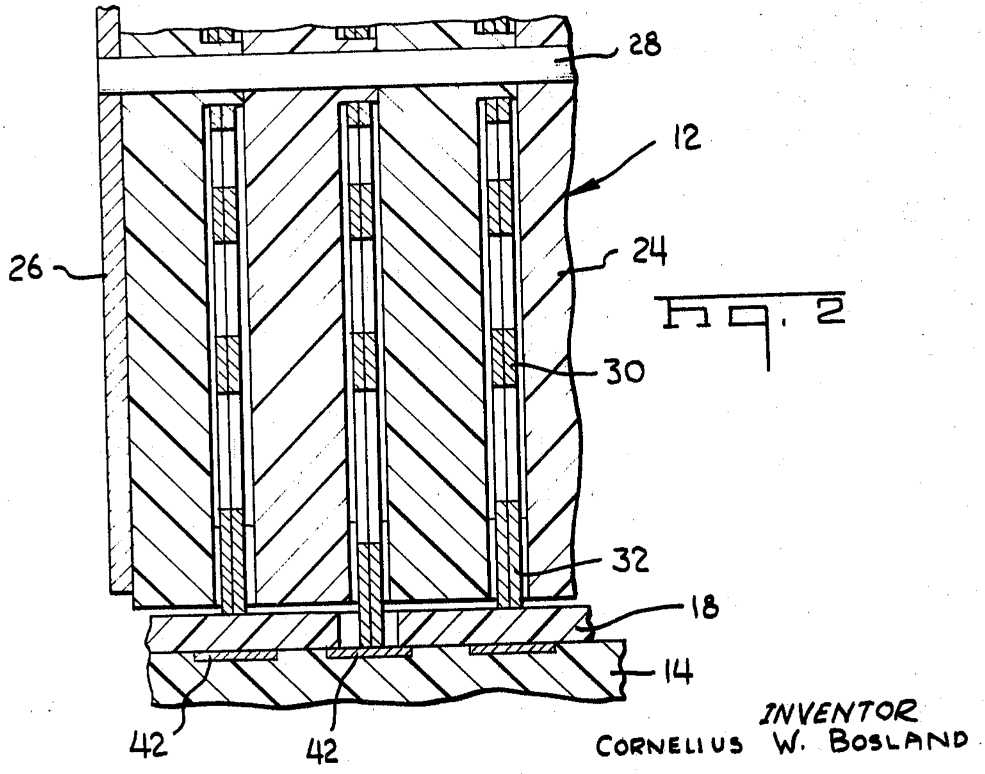
Figures 3, 4:
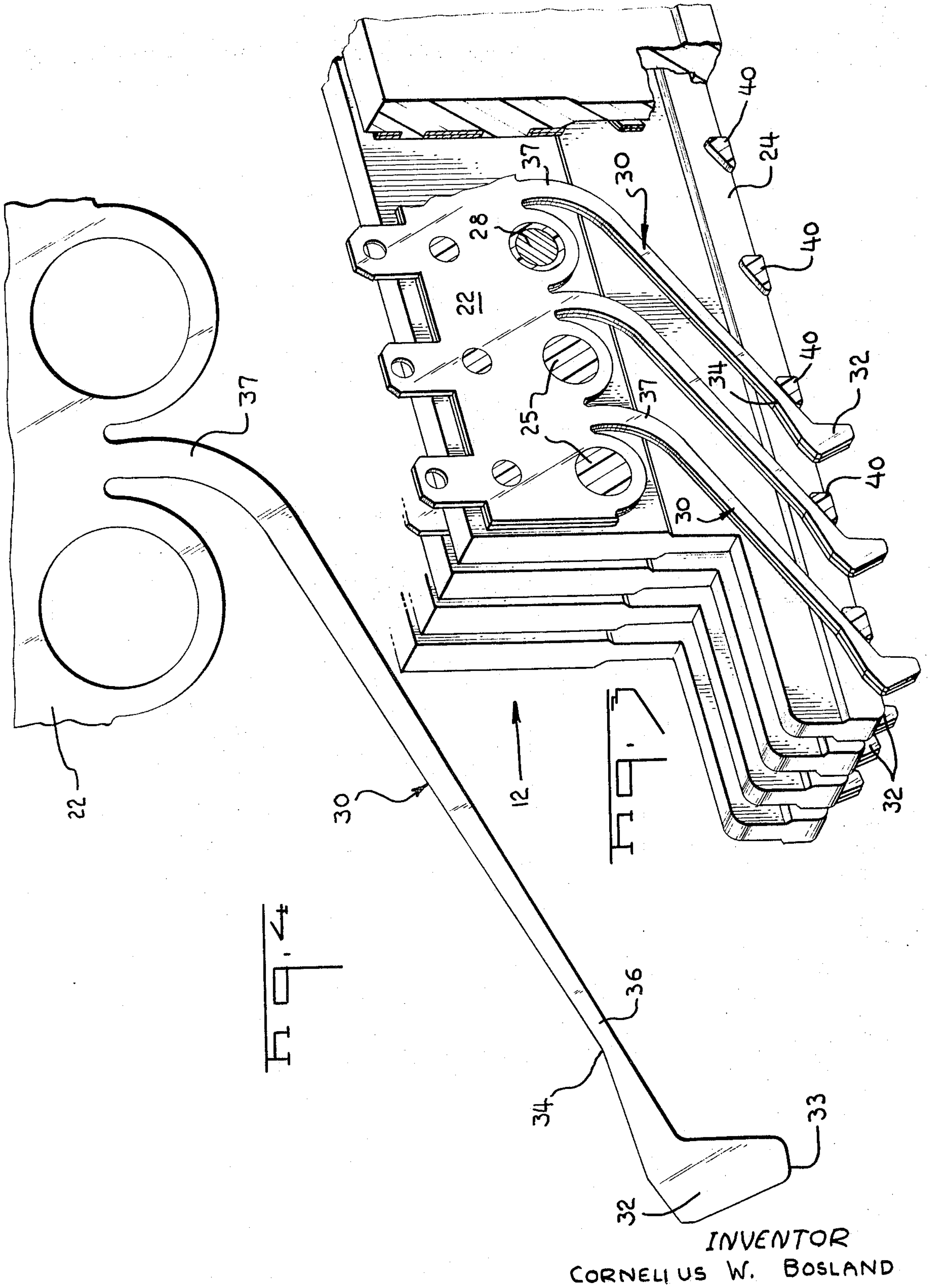

A better understanding of the invention together with a better appreciation of its many advantages will best be gained from the following description given in connection with the accompanying drawings wherein:

FIG. 1 is a longitudinal cross-section of a card reader with a sensing spring arrangement provided in accordance with the invention, FIG. 2 is an enlarged section view taken as indicated by lines 2—2 in FIG. 1 and showing three pairs of sensing springs, one pair of which is reading a hole in a credit card, FIG. 3 is an enlarged perspective view of a spring head assembly showing how the sensing springs are mounted, and FIG. 4 is a further enlarged view of a sensing spring showing its exact shape.

The credit card reader 10 shown in FIG. 1 includes a spring head assembly generally, indicated at 12, a platen 14, and a frame or housing 16. As seen at the left, the housing has an opening into which can be inserted a credit card 18. After the card has been inserted, it is "read" by the sensing springs in the spring head. To this end, the reader includes a camming mechanism which moves the spring head down toward the platen. This mechanism is operated by a manual lever 20. Further details of such a mechanism will be found in the prior art. A suitable mechanism is described in U.S. Pat. application, Ser. No. 441,179, filed Mar. 19, 1965.

As seen in FIGS. 2 and 3, spring head 12 comprises a number of thin, flat spring strips 22 arranged in spaced-apart pairs. Each pair of strips is clamped between plastic laminations 24, the strips and laminations being held in precise alignment by holes in strips 22 mating with lugs 25 of the laminations. The strips and laminations are formed into a rigid assembly and are held within an outer metal sub-frame 26, a portion of which is seen in FIG. 2, by cross-wise pins 28.

Each spring strip 22 has projecting downward from its body a plurality of specially shaped sensing springs 30, the exact configuration of which is shown in FIG. 4. The lower end of the spring comprises a club-shaped tip 32 having a bottom edge 33 which is smoothly rounded. The top edge of tip 32 tapers at zone point 34 into a beam-like arm 36 which at its upper end 37 curves into and is integral with the body of strip 22. Arm 36 is narrowest at point 34 and widest at its upper, curved portion 37. The amount of taper is such that when the tip of the spring is deflected, the stresses in it are substantially equal at cross-section along arm 36 between point 34 and portion 37. By way of example, each strip 22 is made of mill hardened, HM temper, beryllium copper, 0.009 inch thick. The springs are punched or cut to the shape shown in a progressive die. Spring arm 36 from point 34 to portion 37 has a length of about 0.6 inch. Its lengthwise axis lies at about 33° relative to horizontal. The width of arm 36 at point 34 is about 0.017 inch, and at portion 37 about 0.030 inch, which is approximately a two to one taper over the length of arm 36. The other dimensions and shapes of each spring are drawn to exact scale (approximately 10 to 1) in FIG. 4.

As seen best in FIG. 3, each pair of springs in its rest position bears against and rests on a respective shoulder 40 molded integral with lamination 24. The shoulders 40 and lugs 25 extend outward slightly more than the combined thickness of the two springs 30 so that when the laminations and springs are clamped together, springs 30 have a slight lateral clearance between the laminations and are free to deflect upward from the position shown. Shoulders 40 are high enough to provide a slight pre-stressing of the springs; the shoulders assure absolute vertical alignment of the tips of the springs.

When the spring head is down in "read" position as shown in FIG. 2, spring tips 32 sense the holes in the card. Here, the second pair of springs has encountered a hole, and their tips 32 extend through the hole and make electrical contact with a respective conductive area 42 on platen 14. Those tips not encountering a hole are deflected upward and rest upon the top face of the card. The provision of two springs side-by-side insures greater reliability in making electrical contact with areas 42. Details of wiring to an external circuit from areas 42 and from springs 30 can be found in the prior art.

In a sensing spring arrangement substantially identical to the one described above which has been built and successfully tested, springs 30 withstood more than a million reading operations without any failure. The predeflection of the springs by shoulders 40 was about 0.020 inch. The nominal read (hole present) pressure of each spring with a 0.020 inch deflection off of shoulder 40 was 30 grams, and the no-hole pressure was 45 grams when the springs were deflected an additional 0.020 inch.

The above description is intended in illustration and not in limitation of the invention. Various modifications or changes in the embodiment shown may occur to those skilled in the art and can be made without departing from the spirit or scope of the invention as set forth.

I claim:

1. In a card reader a platen, a frame in which said platen is mounted, a spring head assembly for reading a card such as relatively thick credit card, and means to move said head assembly and platen relatively toward and away from each other, said head assembly comprising a plurality of spring strips spaced apart by insulating laminations, each strip comprising a body having integral long thin spring arms projecting downward at an angle, each arm having a taper along its length and a sensing tip adapted to contact said platen, said taper having minimum cross-section immediately adjacent said tip, the shape of said arm providing substantially constant stress at all cross sections along said arm when its tip is deflected in reading a card.

2. The arrangement in claim 1 wherein said strip and spring arms are fabricated out of a thin flat strip of spring material, said arms having substantially a two to one continuous taper in width along their entire length.

3. The arrangement in claim 1 wherein each of said laminations has a plurality of precisely located shoulders, each of said spring arms near its tip bearing upon and being pre-stressed by respective ones of said shoulders.

4. In a card reader, an improved sensing spring arrangement comprising a thin flat strip body having integral with and depending from itself a long thin arm the axis of which lies at substantially a 30° angle relative to said body, said arm having a sensing tip at its outer end and having a taper over its length of substantially two to one, said taper having minimum cross-section immediately adjacent said tip to provide substantially uniform stress at all cross-sections along said tapered portion, and insulating means to support said strip body.

5. The arrangement of claim 4 wherein said strip is spring metal substantially one one-hundredth of an inch thick, said arm having a length of substantially half an inch, the width of said arm near body being substantially three one-hundredths of an inch.

6. The arrangement in clain 4 wherein there are a plurality of said arms depending from said body, each arm near its tip being pre-stressed and held in precise vertical alignment with freedom to move vertically by said insulating means.

7. In a card reader, an improved spring head assembly comprising a plurality of thin spring strips and a plurality of insulating laminations spacing them apart, said strips and laminations being tightly held together, each of said strips being a thin sheet of spring metal having a lengthwise body with a plurality of long curved arms depending from said body and integral therewith, each of said arms having at its outer end a sensing tip and tapering along its length providing substantially constant stress at all cross sections along said arm when said tip is deflected said taper having minimum cross-section immediately adjacent said tip.

8. In a card reader wherein the card sensing elements are suject to relatively large deflections, an improved sensing spring comprising a flat strip of spring metal having a body with a long thin curved arm depending therefrom and integral therewith, said arm having a sensing tip at its outer end and being tapered along its length providing substantially constant stress at all cross sections along said arms when said tip is deflected said taper having minimum cross-section immediately adjacent said tip.

9. The structure in claim 8 wherein said strip is spring temper beryllium copper roughly one one-hundredth of an inch thick, said arm having a length of substantially half an inch, the width of said arm near said body being substantially three one-hundredths of an inch and tapering continuously to substantially half said width near said tip, said arm lying at an acute angle relative to said body.

10. In a card reader, a platen, a frame in which said platen is mounted, a spring head assembly for reading a card such as a relatively thick credit card, and means to move said head assembly and platen relatively toward and away from each other, said head assembly comprising a plurality of spring strips spaced apart by insulating laminations, each strip comprising a body having integral long thin spring arms projecting downward at an angle, substantially a 30° angle relative to said body, said arm having a sensing tip at its outer end and having a taper over its length of substantially two to one, and insulating means to support said strip body, wherein said strip is spring metal substantially one one-hundredth of an inch thick, said arm having a length of substantially half an inch, the width of said arm near said body being substantially three one-hundredths of an inch, wherein there are a plurality of said arms depending from said body, each arm near its tip being pre-stressed and held in vertical alignment with freedom to move vertically by said insulating means, the largest surface area of each spring strip being disposed in a plane normal to the card, said pre-stressed position of said springs being determined by a plurality of shoulders formed on said insulating laminations, said springs normally resting on said shoulders.

* * * * *